Aug. 23, 1955 P. Z. ANDERSON 2,715,822
DRIVE COUPLING AND ASSEMBLY
Filed Jan. 8, 1952 3 Sheets-Sheet 1
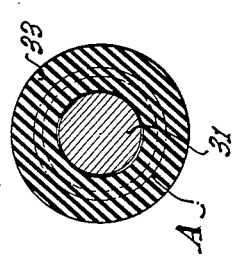
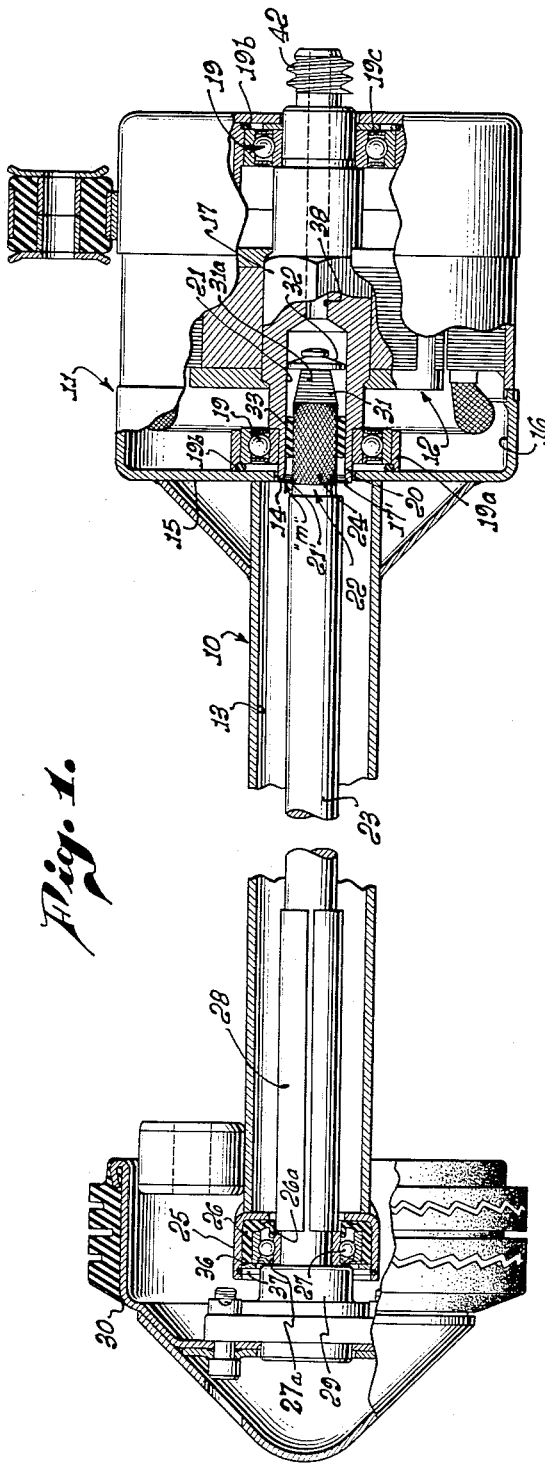
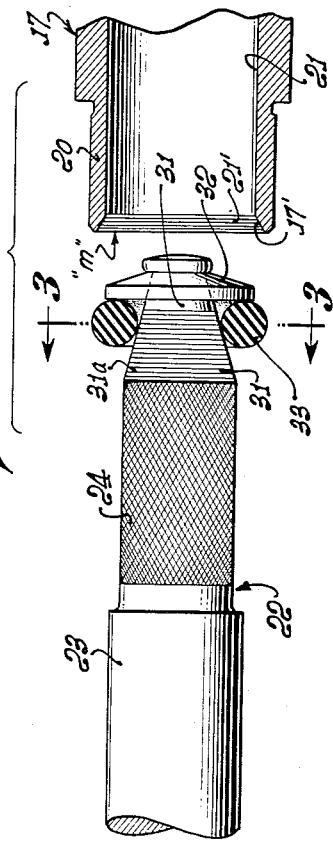
PAUL Z. ANDERSON,
INVENTOR.
BY
Barkeleo & Scantlebury
ATTORNEYS.

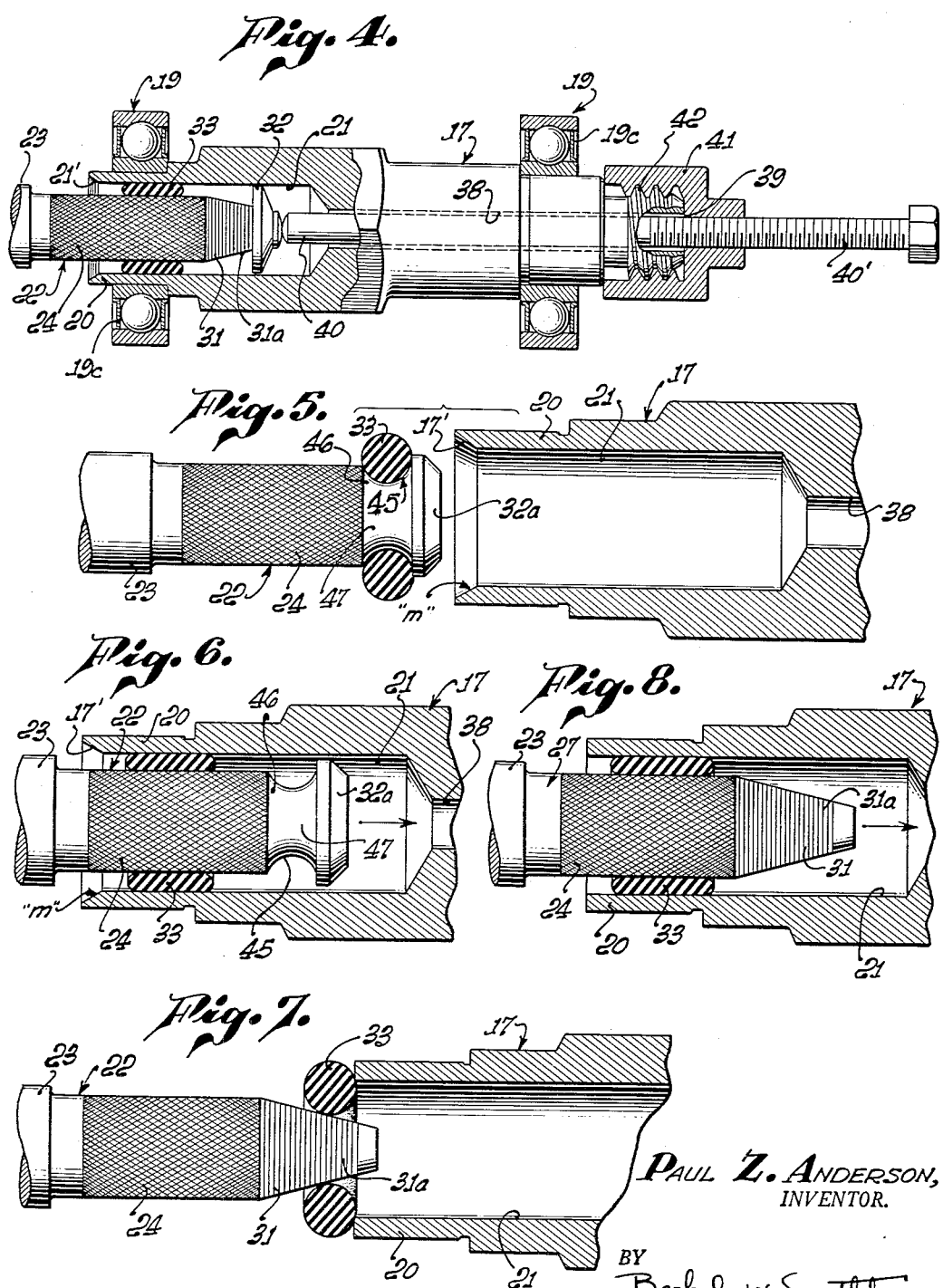

Aug. 23, 1955
P. Z. ANDERSON
2,715,822
DRIVE COUPLING AND ASSEMBLY
Filed Jan. 8, 1952
3 Sheets-Sheet 3
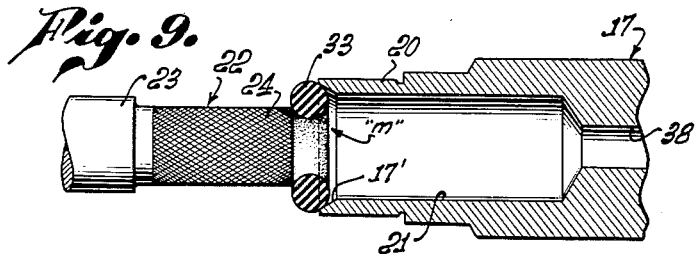
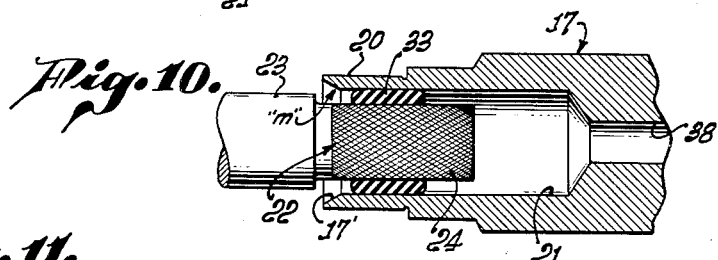
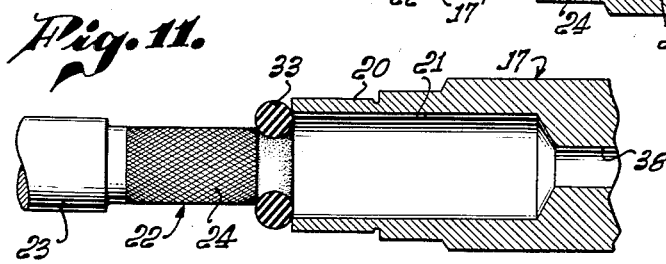
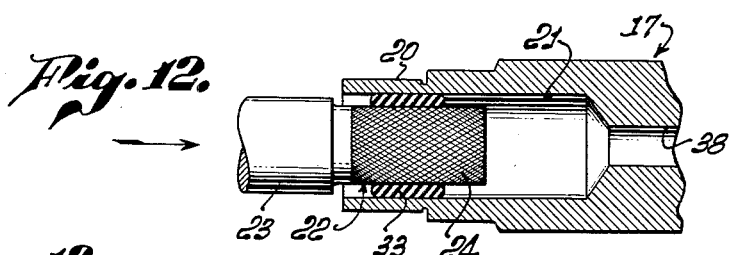
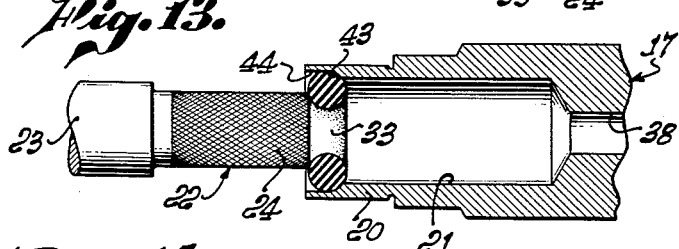
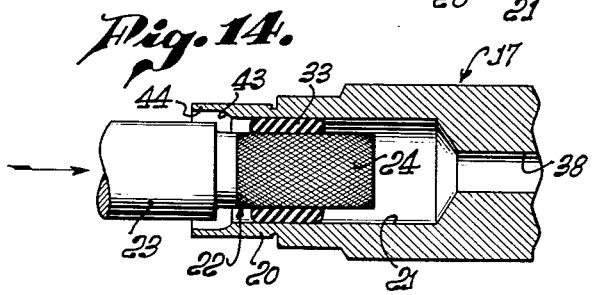
PAUL Z. ANDERSON,
INVENTOR.
BY
Batchelor & Scantlebury
ATTORNEYS.

United States Patent Office 2,715,822
Patented Aug. 23, 1955

2,715,822

DRIVE COUPLING AND ASSEMBLY

Paul Z. Anderson, Whittier, Calif., assignor to Preco Incorporated, Los Angeles, Calif., a corporation of California Application January 8, 1952, Serial No. 265,454

5 Claims. (Cl. 64—11)

This invention has to do generally with drive couplings and assemblies, and is more particularly concerned with such devices as applied to the transmission of rotational forces.

While the invention is not at all so limited, it is especially well adapted to situations where the coupling has to be made up or broken "blind," that is, the point of coupling is so located in the drive assembly that it is inaccessible for direct inspection and manipulation when the coupling parts are to be connected or disconnected. And the arrangement is such that, in spite of the ease of making up and breaking down the assembly, and in spite of the inaccessibility of the coupling to normal handling, the coupled parts are held in proper axial alinement and are amply efficient in drive transmission.

There are many situations in which the coupling and assembly may be used to advantage, but I have illustrated a specific embodiment wherein the advantages are particularly noteworthy. However, this showing and description of the specific embodiment are not to be considered as limitative on the invention. This embodiment is concerned with the drive of a generator from the wheels of a refrigerator car and adapted, in turn, to generate current for the operation of air-circulatory fans used in the cooling system of the car.

The illustrative unit includes a long, tubular housing, at one end of which is an enlarged cylindrical housing accommodating a generator. The drive shaft extends from the generator through the tubular housing and terminates in a traction wheel adapted, by the bodily swinging of the unit, to be selectively engaged with or disengaged from one of the running-gear wheels of the car. It is the coupling between this drive shaft and the shaft of the generator rotor, with which one embodiment of the invention is concerned. The drive shaft has to be entered through the open end of the long tubing and its free end somehow drivingly connected to the rotor shaft. This point of connection is not only relatively distant from the open end of the relatively small-diameter tubing, but it is entirely inaccessible as far as direct application of assembling tools is concerned.

To solve this problem, I have provided a deformable, resilient, "anchor-ring" or "torus" which, when unrestrained, has an inside diameter less than the outside diameter of the free end of the drive shaft. Before the drive shaft is assembled with the housings, this ring is placed at the free end of the shaft. The rotor shaft, in turn, has an axial bore or socket opening towards the tube-bore, the inside diameter of this shaft bore being considerably larger than the outside diameter of the drive shaft but being appreciably less than the outside diameter of the "anchor-ring" when the latter is operatively applied to the drive shaft.

In assembling the unit, the drive shaft, with the resilient ring applied as above, is entered through the housing-tube bore until its free end is adjacent and approximately centered with the bore of the rotor shaft. Endwise pressure is then applied to the drive shaft at its wheel-end and the resilient ring is thus "rolled" into the rotor-shaft bore, the ring, of course, being deformed in the process and finally assuming the cross-sectional characteristics which give it the general form of an elongated, cylindrical sleeve, the material of which is under great radial compressive strain. The ring thus possesses powerful gripping capacity on both the drive shaft and the rotor shaft, coupling them together so that drive may be fully effectively transmitted from one to the other.

As the drive shaft is finally pressed home, a bearing at the wheel-end thereof is pressed into a rubber cup carried at the outer end of the tubular housing, and, finally, a snap ring is applied against a keeper-ring at the end of the bearing to hold all parts in assembly. The axially spaced rubber cup and rubber drive-connection ring hold the shaft and tubular housing in approximate co-axial relation, and also serve to absorb much of the vibration and jar to which mechanisms of this sort are exposed. The two rubber elements accommodate the assembled shafts to any slight mis-alinement of the end-bearings.

The disconnection of the coupling may be accomplished by detaching the snap ring and then merely pulling on the wheel-end or thrusting on the opposite end of the drive shaft until the rubber drive-connection ring is freed from the rotor-shaft socket.

Other features of novelty and objects of the invention will be made apparent in the following description, reference being had to the accompanying drawings, in which:

Fig. 1 is a medial, sectional view through a device embodying the invention,

Fig. 2 is a detached, fragmentary view of the rotor shaft and the drive shaft, showing a resilient "anchor-ring" applied to the drive shaft, all before connection is made between the two shafts, Fig. 3 is a section on line 3—3 of Fig. 2, Fig. 4 is a fragmentary view of the structure of Fig. 1, showing "knock-out" mechanism applied thereto, Fig. 5 shows a variation of one aspect of the invention, with the elements shown as they appear before they have been coupled together, Fig. 6 shows the elements of Fig. 5 in coupled relation, Fig. 7 shows another variation of one aspect of the invention, with the elements shown as they appear before they have been coupled together, Fig. 8 shows the elements of Fig. 7 in coupled relation, Fig. 9 shows another variation of one aspect of the invention, with the elements shown as they appear before they have been coupled together, Fig. 10 shows the elements of Fig. 9 in coupled relation, Fig. 11 shows another variation of one aspect of the invention, with the elements shown as they appear before they have been coupled together, Fig. 12 shows the elements of Fig. 11 in coupled relation, Fig. 13 shows another variation of one aspect of the invention, with the elements shown as they appear before they have been coupled together; and Fig. 14 shows the elements of Fig. 13 in coupled relation.

In Fig. 1, which illustrates a preferred embodiment of the invention, is shown an elongated tubular housing 10 which is integral with an enlarged, cylindrical housing 11 containing generator 12, the bore 13 of tube 10 communicating through opening 14, in housing wall 15, with the interior 16 of housing 11. The details of the generator, proper, are of no significance here, except for the end-fashioning of rotor-shaft 17. The make-up of housing 11 is likewise unimportant here, and, for present purposes, may be considered as a single, integral unit which, in effect, is sealed up after the generator and its associated parts are operatively installed therein.

Rotor shaft 17 is rotationally supported and positioned endwise within housing 11 by bearings 19 mounted in housing-rings 19a, the bearings being end-sealed by O rings 19b. The end 20 of the shaft projects through housing-opening 14. Shaft end 20 is centrally socketed or bored as at 21 for a purpose to be described. The end of shaft 20 is beveled or chamfered at 17' to give the effect of a flaring mouth *m*, preferably of about 60° included angle, for bore 21, and, preferably, the wall defining this mouth is annularly scored as at 21'. One end 22 of drive shaft 23 is of reduced diameter and, preferably, is knurled or similarly mutilated as at 24.

Welded or otherwise suitably secured to the end of housing tube 10, is housing cup 25 within which is fitted a cup-like element 26, of rubber or the like, to receive bearing 27 whereby the associated end of shaft 23 is centered and journaled in housing 10. Element 26 preferably has a lip 26a adapted sealingly to engage sleeve 28 which is welded to the shaft 23. The hub 29 of traction wheel 30 is secured to shaft 23 in any suitable manner, it being this wheel which is adapted to be selectively engaged with a car-wheel (not shown) for driving generator 12.

The cylindrical part 22 of shaft 23 is axially extended in the form of cone 31 which, preferably, is provided with serrations or annular grooves 31a, for a purpose to be described. An annular shoulder and pilot member 32 is provided on the cone near its tip end. Conveniently this member may comprise a conical washer secured in position by welding or by peening the cone-tip, though, as will later appear, the member may be made by directly forming the shaft-end. However, before or after the washer is applied and, in any event, before the drive shaft 23 is thrust into tube 10, there is applied to cone 31 a deformable, resilient annulus 33 which, when free and undeformed, is in the nature of a "torus" or "anchor-ring." I have found that an O ring of natural or synthetic rubber serves the purpose particularly well. When the ring is undeformed, the radial cross-section through any one side of the ring is preferably circular, or nearly so, though this particular original cross-section is not controlling on all the aspects of the invention.

I will find occasion to refer to particular dimensions for purposes of illustrating certain ideal relationships between the ring 33, shaft end 22 and bore 21 when certain conditions prevail, but it will be understood these particular dimensions are not limitative on the invention. As a base reference for these dimensions, it will be assumed that shaft-end 22 is about .825" in diameter. I then select a ring 33 which is about .610" inside diameter and about 1.370" outside diameter, giving it a "thickness" of about .380"—which latter dimension represents the diameter of a radially-taken cross-section through any one side of the ring. This ring is pushed or "sprung" onto the conical end 31 of the drive shaft, either before or after the conical washer 32 is fixed in position, said washer serving as a keeper for the ring, as a pliot for shaft-assembly, and, during disassembly, as a stripper.

The rotor-shaft bore 21 is, in the present example, about 1.125" diameter, the diameter of mouth 21 at its outer end is about 1.250", and the outside diameter of washer 32 is about 1.090", there thus being slight annular clearance between the washer and the rotor shaft when the unit is assembled.

In order to function properly, the effective inside diameter of ring 33 must be less than the diameter of cylindrical portion 22 of shaft 23; that is, when the ring is applied to the terminal 31, the inside diameter of the ring must be less than the diameter of said shaft portion. And the effective outside diameter of the ring must be greater than the inside diameter of bore 21 before shafts 17 and 23 are telescoped into coupled relation; that is, if ring 33 is unexpanded by the tip of the cone when it is initially placed thereon, the outside diameter of the "free," undeformed ring must be greater than the inside diameter of bore 21, while, if the outside diameter of the ring, when said ring is detached and undeformed, is less than the diameter of bore 21, its inside diameter must be such that, when the ring is manually pushed part way up on the cone prior to the entry of shaft 23 into tube 10, the ring will be expanded sufficiently to make its enlarged, or "effective," outside diameter greater than the diameter of bore 21.

When drive shaft 23 is thrust through tube 10, conical washer 32 acts as a pilot to guide the shaft-end into bore 21 and to approximately center ring 33 within said bore, the flaring mouth *m* aiding in the piloting operation. However, O ring 33 is at this time of such effective outside diameter that it will engage chamfer 17' and yieldingly resist further right-wise movement of the shaft. As endwise pressure is increased, the ring 33 will be engaged by the cone face and the mouth face at radially opposite sides of its annular axis A, and, getting added traction from the gripping-serrations 31a and 21', will "roll" up the cone and onto the cylindrical portion 22 of the shaft and simultaneously will be forcibly rolled through mouth *m* and into socket 21, the ring deforming until it reaches the approximate shape shown in Fig. 1. The final shape, here cylindrical, and final position of the ring will depend both on the original cross-sectional shape of ring 33 and upon the length and angle of cone 31, and these characteristics may be varied to secure different final positional and shape effects and hence to secure different drive-transmissive effects.

The annular space between shaft end 22 and the defining wall of socket 21 is about .150" in radial extent, meaning that the final thickness of the ring 33 is about one half of its original, undeformed thickness. On the other hand, the ring takes on the general shape of an elongated, cylindrical sleeve. This sleeve, due to its compression and resiliency, tightly grips both the shaft-end 22 and rotor shaft 17, the knurling 24 aiding in this function. In actual practice, it is found that the coupling, as described, provides very efficient rotary drive transmissive characteristics. It is to be noted that neither the shaft-end 22, with its conical terminal 31, nor annulus 33 need be lubricated to aid in the "roll-in" action, and therefore the assembled coupling is in condition for immediately transmitting torque drive.

During the final stages of coupling shaft-end 22 and rotorshaft 17, bearing 27 enters rubber cup-ring 26, the bearing and cup being of such relative radial dimensions that the rubber ring is radially compressed. The force-fit holds bearing 27 and the left end of shaft 23 in substantial axial alinement with bearings 19 and thus approximately centers the entire drive shaft within housing 10, though the two rubber units 33 and 26 accommodate any slight bearing-misalinements. A retention ring 36 and a snap ring 37 releasably hold bearing 27 and, through sleeve 28, the shaft 23 against leftwise movement. It will be noted that it is possible to insure a full and complete coupling effect without observing close axial tolerances at the point of coupling.

Thus, the assembler, though unable to handle the coupling elements directly, is able to insure a fully effective drive-connection between the drive and rotor shafts by a mere inward and forceful thrust on the wheel-end of the drive shaft assembly. And the rubber elements 33 and 26 serve not only to keep the drive shaft substantially centered within tube 10, but also are capable of absorbing the shocks and effects of jar and vibration which are so prevalent and so often destructive on devices exposed to the severe service conditions of car-wheel drives.

Bearings 19 and 27 are preferably packed with grease and are provided with grease-seal rings 19c and 27a, respectively. It follows that, when the assembly is complete, the housings and bearings are sealed off against the entry of extraneous matter which might otherwise be damaging, and no additional internal lubrication is necessary.

It is also to be noted that the coupling, in spite of its high efficiency as a drive-transmission element, is of the simplest construction and of relatively little cost. And the likelihood of break-down in service is practically nil, which is a very important factor in a device which cannot be repaired en route and yet is a vital element of a critical service.

When it becomes desirable to uncouple the drive and rotor shafts, it is only necessary to remove snap ring 37 and pull out on the wheel 30. The ring 33 will ordinarily "roll" out of bore 21 as shaft end 22 is withdrawn, washer 32 acting as a final stripper and removing the ring along with the shaft as the latter is pulled clear of housing tube 10.

However, as a preferred means for uncoupling the shafts, I provide rotor shaft 17 with a relatively small bore 38 opening at one end to bore 21 and opening at the other end to the exterior, as at 39. Bore 38 is adapted to receive a knock-out pin 40 so shaft 23 may be driven to the left (Fig. 4) and thus cleared from shaft 17. Or the knock-out pin may be threaded, as at 40', and thrust to the left (Fig. 4) to force the shaft 23 clear of shaft 17, by screwing it through "jack-cap" 41, which is removably screwed onto the threaded terminal 42 of rotor shaft 17.

I will now describe several variational embodiments of one aspect of the invention. In all these variations, the several common elements have the same relative dimensional characteristics as those ascribed to similar elements of the preferred form. Furthermore, such similar elements are given the same reference numerals so the foregoing description of the preferred form (Figs. 1 to 3) as well as the foregoing description of the assembly and dis-assembly operations, will generally apply to the variational forms.

In Figs. 5 and 6, all parts are similar to those shown in Figs. 2 and 1, respectively, except for the formation at the end of cylindrical portion 22 of shaft 23. Here, the pilot and keeper 32a is made up of the same stock as that of portion 22, there being a concave groove 45, formed between said pilot and portion, of a curvature to take annulus 33 as in Fig. 5. That portion 46 of neck 47, thus formed between pilot 32a and portion 22, which is adjacent portion 22 may be considered as a relatively sharp-angle cone for aiding the annulus in "rolling" up onto cylindrical portion 22 as the shafts are coupled in the manner previously described.

In Figs. 7 and 8 all parts are similar to those shown in Figs. 2 and 1, respectively, except that no pilot or keeper is shown on the cone-tip, and that the flaring mouth m, opening to bore 21, is omitted.

In Figs. 9 and 10, all parts are similar to those shown in Figs. 2 and 1, respectively, except that here the cone and keeper on the free end of shaft portion 22 are omitted, though the flaring mouth m is still provided to aid in the "rolling-in" action of annulus 33.

In Figs. 11 and 12, the parts are the same as in Figs. 2 and 1, respectively, except that the cone and keeper on shaft-portion 22 and the flaring mouth m on shaft 17 are all omitted, it consequently being more difficult to "roll" the annulus 33 into coupling deformation, but still giving many of the advantages spoken of above.

While the forms of Figs. 9 to 12 show no keeper and pilot similar to member 32, and the annulus 33 may be considered as initially "applied" to the socketed shaft 21, it will be understood that it is contemplated that a formation similar to neck 47 and keeper 32a may be incorporated with these forms whenever such an expedient is necessary or desirable.

In Figs. 13 and 14, all parts are similar to those shown in Figs. 11 and 12, respectively, except that rotor shaft 17 is provided with a counter-socket 43 to which annulus 33 is initially applied. Or portion 44 of the shaft may be considered as a temporary ring-retaining skirt. The annulus 33, when inserted in counter-socket 43 may be in an otherwise "free" and undeformed condition, or it may have originally been of greater inside and outside diameter. In the latter event, when it is inserted into the counter-socket, that is, when it is "applied" to shaft 17, as a preliminary step of assembly, the skirt 44 will have radially contracted the ring 33 sufficiently to make its reduced, or "effective" inside diameter less than the diameter of shaft portion 22.

While I have shown and described preferred embodiments of my invention, it will be understood various changes in design, structure and arrangement may be made without departing from the spirit and scope of my broader claims appended hereto.

I claim:

1. In a drive coupling comprising a pair of axially alined shafts wherein one of the shafts has an axially extending, cylindrical bore opening to one end thereof, and a cylindrical portion of the other shaft being entered in said bore and being annularly spaced from the bore defining wall, there also being an annulus of rubber or the like within the annular space between the shaft ends and pressurally engaging the opposed cylindrical faces thereof; the improvement comprising an annular enlargement on said other shaft and lying within said bore at the inward side of said rubber annulus, said enlargement being of greater diameter than is said cylindrical portion and of substantially the same diameter as the bore.

2. The improvement set forth in claim 1, including also a reduced-diameter neck between the cylindrical portion and the enlargement.

3. In a drive coupling comprising a pair of axially alined shafts wherein one of the shafts has an axially extending, cylindrical bore opening to one end thereof, and a cylindrical portion of the other shaft being entered in said bore and being annularly spaced from the bore defining wall, there also being an annulus of rubber or the like within the annular space between the shaft ends and pressurally engaging the opposed cylindrical faces thereof, the improvement comprising an annular enlargement on said other shaft and lying within said bore at the inward side of said rubber annulus, said enlargement being of greater diameter than is said cylindrical portion, and a reduced diameter neck between the cylindrical portion and the enlargement, said neck comprising a conical shaft portion arranged with its base adjacent the cylindrical portion and its tip adjacent the enlargement.

4. The improvement set forth in claim 3; wherein said enlargement is in the form of a washer secured to the tip end of the conical portion.

5. The improvement set forth in claim 4; wherein the inner face of the washer is square cut and the outer face is conical.

References Cited in the file of this patent

UNITED STATES PATENTS

| | | |
|---|---|---|
| 1,892,037 | Crews | Dec. 27, 1932 |
| 1,941,061 | Thiry | Dec. 26, 1933 |
| 2,278,095 | Rogers | Mar. 31, 1942 |
| 2,476,894 | Mulheim | July 19, 1949 |

FOREIGN PATENTS

| | | |
|---|---|---|
| 151,751 | Switzerland | 1932 |
| 484,877 | Great Britain | 1938 |